C. A. CHAMPLIN.
VALVE.
APPLICATION FILED JAN. 21, 1919.
1,375,566.
Patented Apr. 19, 1921.
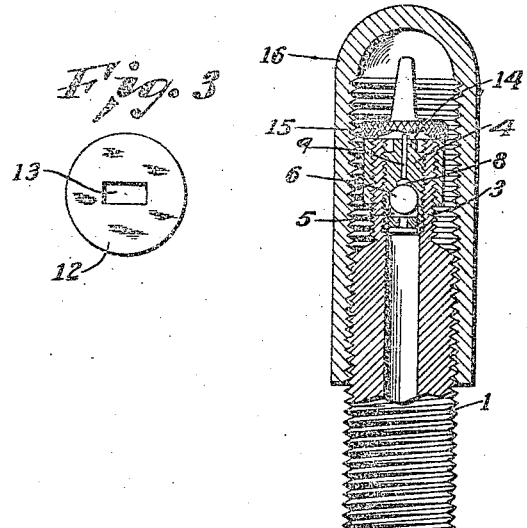
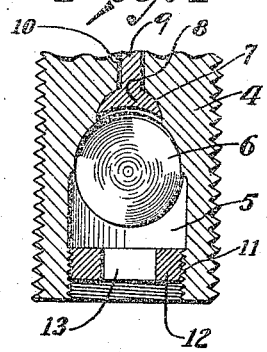
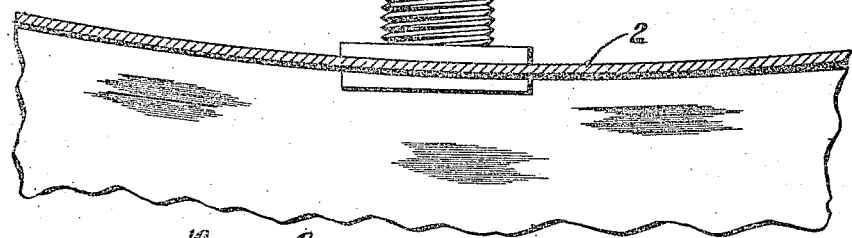
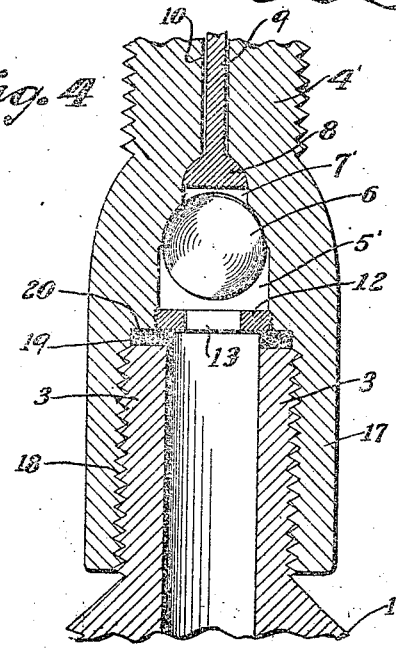
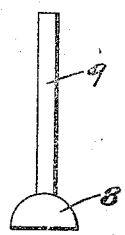
INVENTOR
Charles A. Champlin
BY
ATTORNEY

UNITED STATES PATENT OFFICE.

CHARLES A. CHAMPLIN, OF HOPE, ARKANSAS.

VALVE.

1,375,566.

Specification of Letters Patent.   Patented Apr. 19, 1921.

Application filed January 21, 1919. Serial No. 272,244.

*To all whom it may concern:*

Be it known that I, CHARLES A. CHAMPLIN, a citizen of the United States, residing at Hope, in the county of Hempstead and State of Arkansas, have invented a certain new and useful Improvement in Valves, of which the following is a specification, reference being had to the accompanying drawing, forming a part thereof.

This invention relates to a certain new and useful improvement in valves.

The chief objects of my present invention are to provide a simple, dependable, inexpensive, efficient, and readily accessible valve especially adapted for use in connection with, and to facilitate the inflation of, automobile pneumatic tires and the like, the valve including a valve-member in the form of a sphere adapted for automatic seating in valve-closing or sealing position under the outward pressure or influence of the contained compressed air or other fluid and the valve comprising parts whereby the same is readily and conveniently attachable to standard valve-stems now generally in use, and to improve generally upon, and simplify the construction of, valves of the type described.

With the above and other objects in view, my present invention resides in the novel features of form, construction, arrangement, and combination of parts hereinafter described and afterward pointed out in the claims.

In the accompanying drawing,

Figure 1 is a vertical sectional view of a valve embodying my invention in preferred form;

Fig. 2 is an enlarged fragmental vertical sectional view of the same;

Fig. 3 is a plan view of the plate for retaining or supporting the valve-sphere when the same is in valve-opening position;

Fig. 4 is an enlarged vertical sectional view of a slightly modified form of valve embodying my invention; and Fig. 5 is an elevational view of the headed-rod or plunger for displacing or unseating the valve-sphere during inflation of the tire or other vessel or when ascertaining the pressure of the compressed air contained within the tire or other vessel.

Referring to the said drawing, in which like reference characters refer to like parts throughout the several views, 1 indicates a valve-stem, which is preferably of standard form and construction, and which, in use, is suitably fixed at its lower end, as shown, to, and communicates with the chamber of, the tire or other vessel 2 to be filled or inflated. Stem 1 has a reduced extension 3 at its upper end and, including its extension 3, is externally threaded substantially throughout its length for purposes shortly appearing.

Stem-extension 3 is also preferably internally threaded, as shown, and threaded to seat entirely within the stem-extension 3 is what I term the core 4 of my new valve. The core 4 is substantially straight or of equal diameter throughout its length and at its lower end is recessed to provide a relatively deep chamber, as at 5, adapted to house a sphere 6, the upper wall of chamber 5 having such curvature relatively to the sphere 6 as to neatly accommodate and provide a seat for the sphere 6 when the same is in valve-closing position.

The core 4 is counter-recessed and the upper wall of main chamber 5 correspondingly cut away to provide an additional or auxiliary chamber, as at 7, for the head 8 of a rod or plunger 9 which throughout its length fits loosely or freely in a relatively enlarged axial bore 10 provided in the core 4, and which bore opens at its upper end to the upper end of the core and at its lower end communicates with chamber 7 and therethrough with main chamber 5. The rod-head 8 may be described as substantially segmental in form or shape, the wall of the chamber 7 being throughout of such curvature relatively to the outer or upper face of the head 8 as to neatly accommodate and provide a seat for the head 8 when the sphere 6 is in valve-closing position, the head 8 and the chamber or seat 7 affording an auxiliary valve for checking the passage of any air that may escape through the main valve.

The side walls of the main chamber 5 are partially threaded, as at 11, and threaded therein, as seen particularly in Fig. 2, to provide a support for the sphere 6 when the same is in valve-opening position, is a disk 12 having a transverse orifice 13 providing communication between the core-chamber 5 and the stem 1.

At its upper end, the core 4 is preferably provided with lips or the like 14, whereby the same, through the use of a suitable tool, may be conveniently operatively seated in the stem-extension 3 in the assembling of the valve.

In this form of the device, the entire core carrying the valve parts enters the upper end of the valve stem and fits flush with the upper end of the stem, so that its valve operating rod or plunger is readily accessible for operating the valve.

Normally, as in standard tire-valve, a suitable externally threaded cap 15 is threaded upon stem-extension 3 to protect the core 4 and its associated parts, and also a suitable internally threaded hood 16 seated upon stem 1 to inclose and protect the stem-extension 3 and its cap 15.

The slightly modified form of my valve shown in Fig. 4 is adapted more especially for employment where a larger volume of entering air than is allowed by the preferred form of the valve shown in Fig. 1 is desired. In this modified form of the valve, the core 4', instead of fitting within, and consequently limiting the passage of air through the stem, is enlarged and formed lengthwise with an extension 17, which is longitudinally recessed to provide the sphere-chamber 5' and rod-head chamber 7', but also counter-bored and threaded to provide an internally threaded socket, as at 18, adapted for engagement with the external threads of the stem-extension 3, whereby the core 4' is adapted to fit upon the stem as shown, a gasket 19 being preferably interposed between the upper end of the stem-extension 3 and the shoulders 20 formed in the core-extension 17 by providing the counter-bored socket 18. In this form of valve, the cap 15, while not shown, is adapted to seat upon the upper externally threaded portion of the core 4'. Otherwise than stated, this form of the valve is substantially similar to the preferred form of valve before described, the core 4', although larger in size than the core 4 and consequently providing or affording a larger sphere-chamber with a correspondingly larger valve-closing sphere, being equally adapted for convenient attachment to, and use with, standard stems now generally in use.

In use or operation, the sphere 6 will be tightly held to its seat in valve-closing position under the substantially constant outward pressure of the compressed air or other fluid contained within the tube or other vessel 2. Should the tube or other vessel 2 become punctured or otherwise deflated, the sphere 6 will automatically unseat itself and be supported by the disk 12, which disk will likewise support the sphere 6 during the inflation or filling of the tube or other vessel 2, at which time the greater pressure of the incoming air will force the sphere 6 from its seat. The sphere 6 may also be unseated when desired, as during inflation of the vessel 2 or as in ascertaining the pressure of the contained air or other fluid, by downwardly manipulating the rod or plunger 9, the under face of the head 8 of which may be either flat, as seen in Figs. 4 and 5, or concaved, as seen in Figs. 1 and 2, for convenient coöperation and engagement with the closing-sphere 6. In assembling the parts of the valve attachment, the valve operating rod or plunger 9 is first placed in the bore of the core from the under side and its stem passing into the bore 10 and its head 8 seating into the recess 7; the ball valve 6 is then placed in the recess 5, and then the disk 12 screwed in place, thus maintaining the core and its attached valve parts in assembled condition, so that the core with its attached valve parts are readily attachable and detachable from the standard valve stem in their assembled condition.

My new valve may be cheaply produced, may be readily attached to, and used with, standard valve stems without change in their construction, and has been found exceedingly efficient in operation.

It is to be understood that minor changes in the form, construction, arrangement, and combination of the several parts of the valve may be made and substituted for those herein shown and described without departing from the nature and principle of my invention.

Having thus described my invention, what I claim and desire to secure by Letters Patent is:

1. In an inflation valve, the combination with a standard valve stem adapted to be permanently fitted at its lower end to an article to be inflated and having its upper end screw-threaded, of a self-contained valve comprising a core having an enlarged recess in its lower end terminating in a curved valve seat, and a reduced bore extending from said recess to the upper end of said core, and a rounded countersink at the lower end of said reduced bore affording a recess or seat above the valve seat in said enlarged recess, an independent valve-operating rod or plunger adapted to be fitted in the reduced bore in said core through said enlarged recess and provided with a curved head adapted to entirely enter the countersink of said bore and engage the rounded seat therein, a ball valve loosely fitted in the enlarged recess in said core and adapted to engage the seat therein, a perforated disk screwthreaded into the lower end of said enlarged recess in said core to maintain the parts of the valve in assembled condition, the said headed valve-operating rod and its seat serving as an auxiliary valve to check the flow of any pressure escaping past the ball valve when in pressure closed condition, and said core with its assembled or self-contained valve parts adapted to be screwed upon and removed from said standard valve stem in their assembled condition.

2. In an inflation valve, the combination with a standard valve stem adapted to be permanently secured at its lower end to the article to be inflated and having an exteriorly threaded reduced portion at its upper end adapted to receive a closing cap, the said reduced portion also being interiorly screwthreaded to a depth substantially equal to the depth of said reduced portion of a self-contained assembled valve structure adapted to be bodily fitted in and removed from the upper end of said fixed standard valve stem, and comprising an exteriorly threaded core of uniform diameter throughout its entire length and of substantially the same depth as the interiorly threaded reduced portion of said stem and provided in its inner end with an enlarged recess terminating in a curved valve seat, a bore of smaller diameter extending from said recess to the outer end of said core, and a countersink or chamber at the inner end of said smaller bore, the said enlarged recess being screwthreaded at its lower end, an independent headed valve-operating rod adapted to be fitted in the lower end of said core and extending through the reduced bore therein with its head fitting in the countersink of said bore and its upper end adapted to be projected beyond the upper end of the core by the pressure of the valve, a ball valve loosely fitted in the enlarged recess in said core and adapted to engage the curved seat therein under pressure, and a perforated disk threaded wholly within the lower end of said recess to maintain the parts of the valve in assembled condition in said core, whereby the said valve in its assembled condition may readily be fitted in and removed from the standard valve stem.

3. In an inflation valve, the combination with a standard valve stem adapted to be permanently secured to the article to be inflated and having an exteriorly threaded reduced portion at its upper end adapted to receive a closing cap, the said reduced portion also being interiorly screwthreaded to a depth substantially equal to the depth of said reduced portion, of a self-contained assembled valve structure adapted to be bodily fitted in and removed from the upper end of the standard valve stem, and comprising an exteriorly threaded core of uniform diameter throughout its entire length and of substantially the same depth as the interiorly threaded reduced portion of said stem and provided in its inner end with an enlarged recess terminating in a curved valve seat, a bore of smaller diameter extending from said recess to the outer end of said core, and a countersink or chamber at the inner end of said smaller bore, the said enlarged recess being screwthreaded at its lower end, an independent headed valve-operating rod adapted to be fitted in the lower end of said core and extending through the reduced bore therein with its head fitting in the countersink of said bore and its upper end adapted to be projected beyond the upper end of the core by the pressure of the valve, a ball valve loosely fitted in the enlarged recess in said core and adapted to engage the curved seat therein under pressure, and a perforated disk threaded wholly within the lower end of said recess to maintain the parts of the valve in assembled condition in said core, the said core having a wrench receiving upper end entering flush within the upper end of the standard valve stem, whereby the said valve in its assembled condition may readily be fitted in and removed from the standard valve stem.

In testimony whereof, I have signed my name to this specification.

CHARLES A. CHAMPLIN.